United States Patent
Liao et al.

(10) Patent No.: US 9,069,203 B2
(45) Date of Patent: Jun. 30, 2015

(54) LIQUID CRYSTAL PANEL

(71) Applicant: Shenzhen China Star Optoelectronics Technology Co., Ltd., Shenzhen, Guangdong (CN)

(72) Inventors: Zuomin Liao, Shenzhen (CN); Jingfeng Xue, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/981,987

(22) PCT Filed: Jun. 28, 2013

(86) PCT No.: PCT/CN2013/078295
§ 371 (c)(1),
(2) Date: Jul. 26, 2013

(87) PCT Pub. No.: WO2014/173004
PCT Pub. Date: Oct. 30, 2014

(65) Prior Publication Data
US 2014/0320794 A1 Oct. 30, 2014

(30) Foreign Application Priority Data
Apr. 25, 2013 (CN) .......................... 2013 1 0147856

(51) Int. Cl.
*G02F 1/1333* (2006.01)
(52) U.S. Cl.
CPC .... *G02F 1/133371* (2013.01); *G02F 1/133305* (2013.01); *G02F 1/1333* (2013.01)

(58) Field of Classification Search
CPC .......................... G02F 1/1333; G02F 1/133305
USPC ................................... 349/158, 160
See application file for complete search history.

(56) References Cited

FOREIGN PATENT DOCUMENTS

| CN | 1991538 A | 7/2007 |
|----|-----------|--------|
| CN | 101097359 A | 1/2008 |
| CN | 101833193 A | 9/2010 |
| JP | 2000305099 A | 11/2000 |
| JP | 2004157148 A | 6/2004 |
| JP | 2005221588 A | 8/2005 |
| JP | 4196645B2 B2 | 12/2008 |

OTHER PUBLICATIONS

Translation of JP2005221588, Aug. 18, 2005, Sharp KK.*

* cited by examiner

*Primary Examiner* — Phu Vu
(74) *Attorney, Agent, or Firm* — Andrew C. Cheng

(57) ABSTRACT

The present invention provides a liquid crystal panel, which includes: a thin-film transistor (TFT) substrate, a color filter (CF) substrate opposite to the TFT substrate, and a liquid crystal layer arranged between the TFT substrate and the CF substrate. The TFT substrate includes a first glass substrate and a pixel electrode. The CF substrate includes a second glass substrate and a common electrode. The pixel electrode includes a plurality of pixels, each of which includes a plurality of sub-pixels. Each sub-pixel includes: a first zone and a second zone adjacent to the first zone. The first zone has a liquid crystal cell thickness that is greater than or smaller than a liquid crystal cell thickness of the second zone. The same driving voltage applied to the first and second zones of would result in different electric fields due to the different liquid crystal cell thicknesses.

4 Claims, 3 Drawing Sheets

LIQUID CRYSTAL PANEL

BACKGROUND OF THE INVENTION

1. Field of the Invention

The present invention relates to the field of liquid crystal displaying, and in particular to a liquid crystal panel that improves color shift at large angles.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that with liquid crystal molecules interposed between two parallel glass substrates, application of electricity is selectively carried out to control the liquid crystal molecules to change direction in order to refract out light emitting from the backlight module for generating images. Since the liquid crystal panel itself does not emit light, light must be provided by the backlight module in order to normally display images. Thus, the backlight module is one of the key components of an LCD. The backlight modules can be classified in two types, namely a side-edge backlight module and a direct backlight module, according to the position where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel. The side-edge backlight module comprises an LED light bar, serving as a backlight source, which is arranged at an edge of a backplane to be located rearward of one side of the liquid crystal panel. The LED light bar emits light that enters a light guide plate (LGP) through a light incident face at one side of the light guide plate and is projected out of a light emergence face of the light guide plate, after being reflected and diffused, to pass through an optic film assembly to form a planar light source for the liquid crystal panel.

To improve displaying quality of a large viewing angle liquid crystal panel, the common solution of the industry is dividing a sub-pixel into two zones and the two zones are arranged to have inconsistent V-T curves (voltage-transmission curve). Through imposition of the V-T curves of the two zones, the original V-T curve can be improved and eventually improvement of the displaying quality of the large viewing angle liquid crystal panel is realized. As shown in FIG. 1, a known arrangement for forming inconsistent V-T curves for the two zones is to induce a voltage difference between the two zones 100, 200 through capacitive coupling after the capacitors have been charged and eventually the V-T curves of the two zones 100, 200 become different, allowing them to be superimposed. However, this arrangement requires an increased area for disposing electronic components/devices, such as coupling capacitors. This is disadvantageous for the pixel aperture rate. The term "aperture rate" indicates a ratio between the area of a pixel, with the portions where wiring and transistor (often being concealed by a black matrix) are arranged removed, through which light can transmit and the entire surface area of the pixel.

SUMMARY OF THE INVENTION

An object of the present invention is to provide a liquid crystal panel, which arranges different liquid crystal cell thicknesses for two zones of a sub-pixel in order to improve the color shift issue of a liquid crystal panel at a large angle, increase the pixel aperture rate and transmittance of the liquid crystal panel, and lower down the manufacture cost.

To achieve the above object, the present invention provides a liquid crystal panel, which comprises: a thin-film transistor (TFT) substrate, a color filter (CF) substrate opposite to the TFT substrate, and a liquid crystal layer arranged between the TFT substrate and the CF substrate. The TFT substrate comprises a first glass substrate and a pixel electrode provided on a surface of the first glass substrate that faces the CF substrate. The CF substrate comprises a second glass substrate and a common electrode provided on a surface of the second glass substrate that faces the TFT substrate. The pixel electrode constitutes a plurality of pixels. Each of the pixels comprises a plurality of sub-pixels. Each of the sub-pixels comprises: a first zone and a second zone adjacent to the first zone. The first zone has a liquid crystal cell thickness that is greater than or smaller than a liquid crystal cell thickness of the second zone.

The liquid crystal cell thickness of the first zone is smaller than the liquid crystal cell thickness of the second zone. The first glass substrate comprises a first raised section formed in the first zone of the sub-pixel. The pixel electrode is formed with a second raised section corresponding to the first raised section.

The first raised section is formed on the first glass substrate through coating or chemical vapor deposition.

The liquid crystal cell thickness of the first zone is smaller than the liquid crystal cell thickness of the second zone. The second glass substrate comprises a third raised section formed in the first zone of the sub-pixel. The common electrode is formed with a fourth raised section corresponding to the third raised section.

The third raised section is formed on the second glass substrate through coating or chemical vapor deposition.

The liquid crystal cell thickness of the first zone is greater than the liquid crystal cell thickness of the second zone. The first glass substrate comprises a first recessed section formed in the first zone of the sub-pixel. The pixel electrode is formed with a second recessed section corresponding to the first recessed section.

The first recessed section is formed in the first glass substrate through etching.

The liquid crystal cell thickness of the first zone is greater than the liquid crystal cell thickness of the second zone. The second glass substrate comprises a third recessed section formed in the first zone of the sub-pixel. The common electrode is formed with a fourth recessed section corresponding to the third recessed section.

The third recessed section is formed in the second glass substrate through etching.

The liquid crystal layer comprises: an aligning polymer and liquid crystal molecules.

The present invention also provides a liquid crystal panel, which comprises: a TFT substrate, a CF substrate opposite to the TFT substrate, and a liquid crystal layer arranged between the TFT substrate and the CF substrate, the TFT substrate comprising a first glass substrate and a pixel electrode provided on a surface of the first glass substrate that faces the CF substrate, the CF substrate comprising a second glass substrate and a common electrode provided on a surface of the second glass substrate that faces the TFT substrate, the pixel electrode constituting a plurality of pixels, each of the pixels comprising a plurality of sub-pixels, each of the sub-pixels comprising: a first zone and a second zone adjacent to the first zone, the first zone having a liquid crystal cell thickness that is greater than or smaller than a liquid crystal cell thickness of the second zone;

wherein the liquid crystal cell thickness of the first zone is smaller than the liquid crystal cell thickness of the second zone, the first glass substrate comprising a first raised section formed in the first zone of the sub-pixel, the pixel electrode being formed with a second raised section corresponding to the first raised section;

wherein the first raised section is formed on the first glass substrate through coating or chemical vapor deposition; and wherein the liquid crystal layer comprises: an aligning polymer and liquid crystal molecules.

The efficacy of the present invention is that the present invention provides a liquid crystal panel, which is constructed to form a raised portion or a recessed in a first zone of a sub-pixel so as to provide the first and second zones of the sub-pixel with different liquid crystal cell thicknesses, whereby the first zone and the second zone, when driven by the same driving voltage, induce different electric fields due to the differences of the liquid crystal cell thickness so as to set the liquid crystal molecules in these two zones at different liquid crystal states, improving the issue of color shift of a liquid crystal panel at a large viewing angle, improving aperture ratio of an pixel, transmittance of the liquid crystal panel, and the displaying quality of the liquid crystal panel, reducing power consumption, and reducing manufacture cost.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
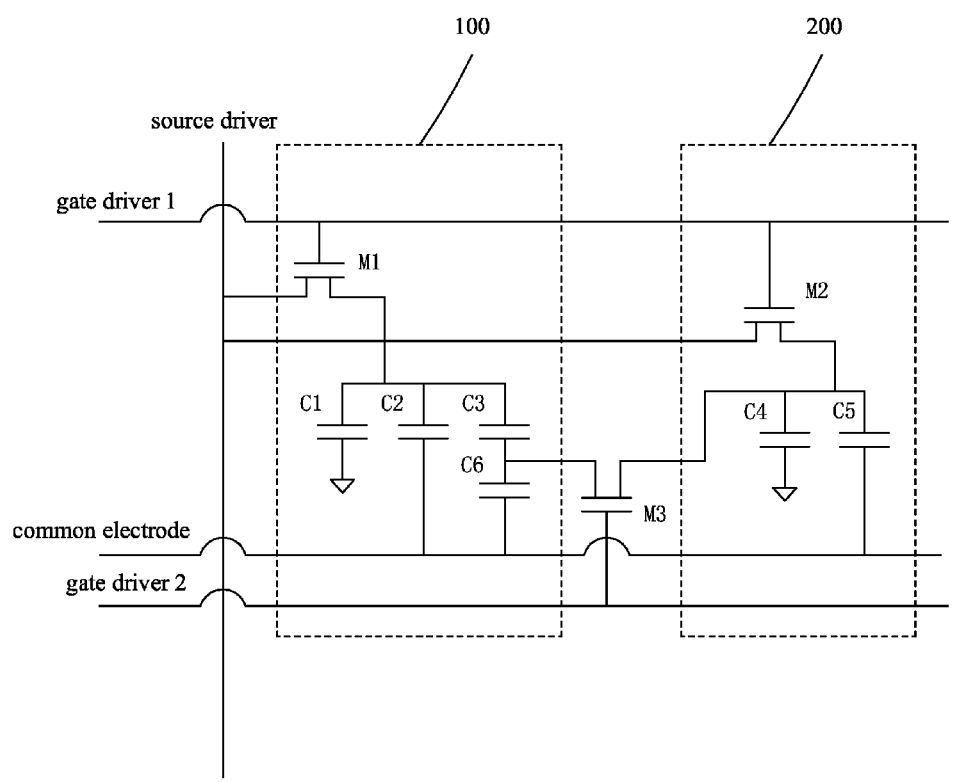
FIG. 1 is a schematic view showing a conventional drive circuit of a liquid crystal panel.
Figure 2:
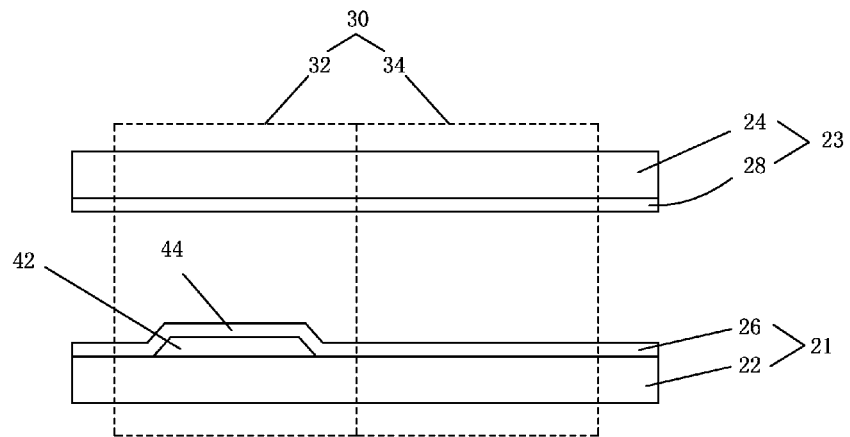
FIG. 2 is a schematic view showing the structure of a liquid crystal panel according to a first embodiment of the present invention.

Referring to FIG. 2, a liquid crystal panel according to a first embodiment of the present invention comprises: a thin-film transistor (TFT) substrate 21, a color filter (CF) substrate 23 opposite to the TFT substrate 21, and a liquid crystal layer (not shown) arranged between the TFT substrate 21 and the CF substrate 23. The TFT substrate 21 comprises a first glass substrate 22 and a pixel electrode 26 provided on a surface of the first glass substrate 22 that faces the CF substrate 23. The CF substrate 23 comprises a second glass substrate 24 and a common electrode 28 provided on a surface of the second glass substrate 24 that faces the TFT substrate 21. The pixel electrode 26 constitutes a plurality of pixels (not shown), and each of the pixels comprises a plurality of sub-pixels 30. Each of the sub-pixels 30 comprises: a first zone 32 and a second zone 34 that is adjacent to the first zone 32.

Each of the pixels preferably comprises three sub-pixels 30. The three sub-pixels 30 are of an identical structure. The three sub-pixels 30 can be a red sub-pixel, a blue sub-pixel, and a green sub-pixel. Each of the pixels emits red, blue, and green lights through the three sub-pixels 30, which lights are mixed at various ratios to provide a desired light. The liquid crystal layer comprises: an aligning polymer and liquid crystal molecules. The aligning polymer is formed by polymerizing a plurality of photosensitive monomers to help aligning the liquid crystal molecules.

In the instant embodiment, the first zone 32 has a liquid crystal cell thickness that is smaller than a liquid crystal cell thickness of the second zone 34. Specifically, the first glass substrate 22 comprises a first raised section 42 that is formed in the first zone 32 of the sub-pixel 30, whereby the pixel electrode 26 is formed with a second raised section 44 corresponding to the first raised section 42. The first raised section 42 is formed through coating or chemical vapor deposition (CVD) on the first glass substrate 22. The location and size of the first raised section 42 can be determined according to practical needs.

With the first raised section 42 provided on the first glass substrate 22 at a location corresponding to the first zone 32 of the sub-pixel 30, the pixel electrode 26 is formed with the second raised section 44 to correspond to the first raised section 42, whereby the liquid crystal cell thickness of the first zone 32 and the liquid crystal cell thickness of the second zone 34 are made different. Thus, an identical driving voltage applied to the first and second zones 32, 34 would provide different electric fields in these zones so that the liquid crystal molecules in these two zones may be set in different liquid crystal states to thereby improve the issue of color shift of a liquid crystal panel at a large viewing angle, increase aperture ratio of an pixel and enhance the displaying quality of the liquid crystal panel, reduce power consumption, and improve users' experiences. Further, the structure of the liquid crystal panel according to the present invention does not affect the rotation of the liquid crystal molecules.

Figure 3:
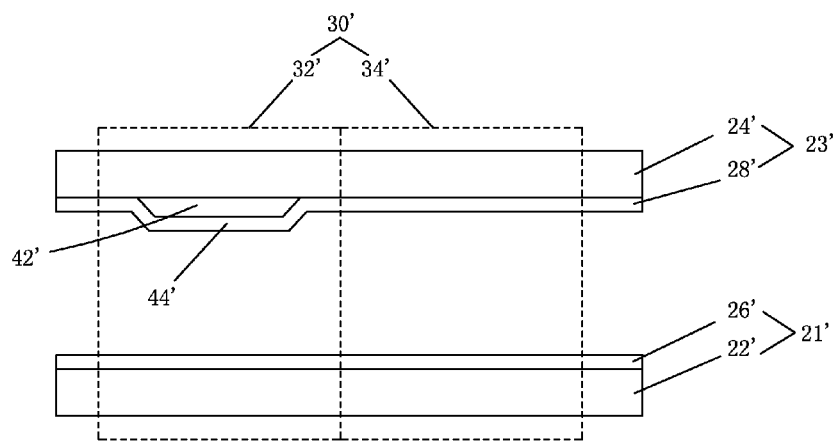
FIG. 3 is a schematic view showing the structure of a liquid crystal panel according to a second embodiment of the present invention.

Referring to FIG. 3, a liquid crystal panel according to a second embodiment of the present invention comprises: a TFT substrate 21', a CF substrate 23' opposite to the TFT substrate 21', and a liquid crystal layer (not shown) arranged between the TFT substrate 21' and the CF substrate 23'. The TFT substrate 21' comprises a first glass substrate 22' and a pixel electrode 26' provided on a surface of the first glass substrate 22' that faces the CF substrate 23'. The CF substrate 23' comprises a second glass substrate 24' and a common electrode 28' provided on a surface of the second glass substrate 24' that faces the TFT substrate 21'. The pixel electrode 26' constitutes a plurality of pixels (not shown), and each of the pixels comprises a plurality of sub-pixels 30'. Each of the sub-pixels 30' comprises: a first zone 32' and a second zone 34' that is adjacent to the first zone 32'.

In the instant embodiment, the first zone 32' has a liquid crystal cell thickness that is smaller than a liquid crystal cell thickness of the second zone 34'. Specifically, the second glass substrate 24' comprises a third raised section 42' that is formed in the first zone 32' of the sub-pixel 30', whereby the common electrode 28' is formed with a fourth raised section 44' corresponding to the third raised section 42'. The third raised section 42' is formed through coating or chemical vapor deposition (CVD) on the second glass substrate 24'. The location and size of the third raised section 42' can be determined according to practical needs.

With the third raised section 42' provided on the second glass substrate 24' at a location corresponding to the first zone 32' of the sub-pixel 30', the common electrode 28' is formed with the fourth raised section 44' to correspond to the third raised section 42', whereby the liquid crystal cell thickness of the first zone 32' and the liquid crystal cell thickness of the second zone 34' are made different. Thus, an identical driving voltage applied to the first and second zones 32', 34' would provide different electric fields in these zones so that the liquid crystal molecules in these two zones may be set in different liquid crystal states to thereby improve the issue of color shift of a liquid crystal panel at a large viewing angle, increase aperture ratio of an pixel and enhance the displaying quality of the liquid crystal panel, reduce power consumption, and improve users' experiences. Further, the structure of the liquid crystal panel according to the present invention does not affect the rotation of the liquid crystal molecules.

Figure 4:
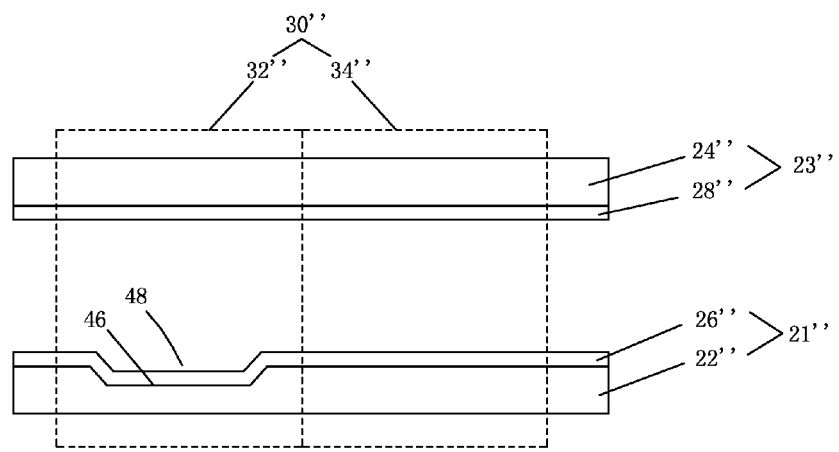
FIG. 4 is a schematic view showing the structure of a liquid crystal panel according to a third embodiment of the present invention.

Referring to FIG. 4, a liquid crystal panel according to a third embodiment of the present invention comprises: a TFT substrate 21", a CF substrate 23" opposite to the TFT substrate 21", and a liquid crystal layer (not shown) arranged between the TFT substrate 21" and the CF substrate 23". The TFT substrate 21" comprises a first glass substrate 22" and a pixel electrode 26" provided on a surface of the first glass substrate 22" that faces the CF substrate 23". The CF substrate 23" comprises a second glass substrate 24" and a common electrode 28" provided on a surface of the second glass substrate 24" that faces the TFT substrate 21". The pixel electrode 26" constitutes a plurality of pixels (not shown), and each of the pixels comprises a plurality of sub-pixels 30". Each of the sub-pixels 30" comprises: a first zone 32" and a second zone 34" that is adjacent to the first zone 32".

In the instant embodiment, the first zone 32" has a liquid crystal cell thickness that is greater than a liquid crystal cell thickness of the second zone 34". Specifically, the first glass substrate 22" comprises a first recessed section 46 that is formed in the first zone 32" of the sub-pixel 30", whereby the pixel electrode 26" is formed with a second recessed section 48 corresponding to the first recessed section 46. The first recessed section 46 is formed through etching in the first glass substrate 22". The location and size of the first recessed section 46 can be determined according to practical needs.

With the first recessed section 46 provided in the first glass substrate 22" at a location corresponding to the first zone 32" of the sub-pixel 30", the pixel electrode 26" is formed with the second recessed section 48 to correspond to the first recessed section 46, whereby the liquid crystal cell thickness of the first zone 32" and the liquid crystal cell thickness of the second zone 34" are made different. Thus, an identical driving voltage applied to the first and second zones 32", 34" would provide different electric fields in these zones so that the liquid crystal molecules in these two zones may be set in different liquid crystal states to thereby improve the issue of color shift of a liquid crystal panel at a large viewing angle, increase aperture ratio of an pixel and enhance the displaying quality of the liquid crystal panel, and reduce power consumption. Further, the structure of the liquid crystal panel according to the present invention does not affect the rotation of the liquid crystal molecules. In addition, compared to the first and second embodiments, the instant embodiment has a simpler manufacture process, saves more material, and is more advantageous for reducing the manufacture cost and increasing the transmittance of the liquid crystal panel.

Figure 5:
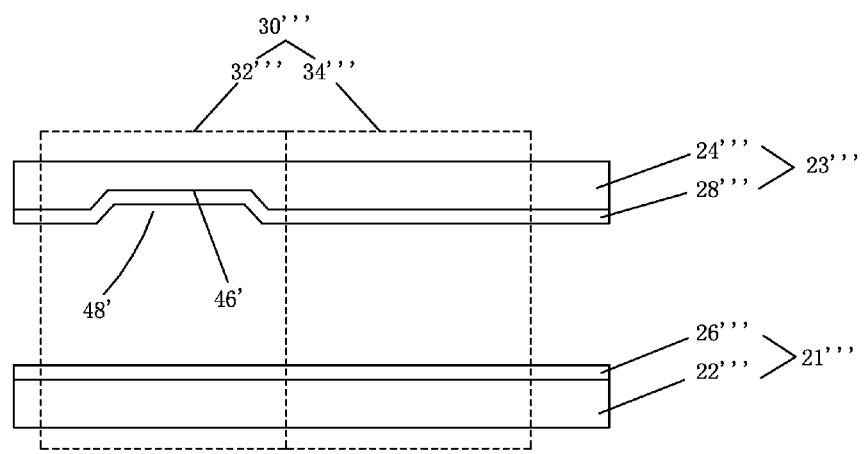
FIG. 5 is a schematic view showing the structure of a liquid crystal panel according to a fourth embodiment of the present invention.

Referring to FIG. 5, a liquid crystal panel according to a fourth embodiment of the present invention comprises: a TFT substrate 21''', a CF substrate 23''' opposite to the TFT substrate 21''', and a liquid crystal layer (not shown) arranged between the TFT substrate 21" and the CF substrate 23". The TFT substrate 21''' comprises a first glass substrate 22''' and a pixel electrode 26''' provided on a surface of the first glass substrate 22''' that faces the CF substrate 23'''. The CF substrate 23''' comprises a second glass substrate 24''' and a common electrode 28''' provided on a surface of the second glass substrate 24''' that faces the TFT substrate 21'''. The pixel electrode 26''' constitutes a plurality of pixels (not shown), and each of the pixels comprises a plurality of sub-pixels 30'''. Each of the sub-pixels 30''' comprises: a first zone 32''' and a second zone 34''' that is adjacent to the first zone 32'''.

In the instant embodiment, the first zone 32''' has a liquid crystal cell thickness that is greater than a liquid crystal cell thickness of the second zone 34'''. Specifically, the second glass substrate 24''' comprises a third recessed section 46' that is formed in the first zone 32''' of the sub-pixel 30''', whereby the common electrode 28''' is formed with a fourth recessed section 48' corresponding to the first third section 46'. The third recessed section 46' is formed through etching in the second glass substrate 24'''. The location and size of the third recessed section 46' can be determined according to practical needs.

With the third recessed section 46' provided in the first glass substrate 22''' at a location corresponding to the first zone 32''' of the sub-pixel 30''', the common electrode 28" is formed with the fourth recessed section 48' to correspond to the third recessed section 46', whereby the liquid crystal cell thickness of the first zone 32''' and the liquid crystal cell thickness of the second zone 34''' are made different. Thus, an identical driving voltage applied to the first and second zones 32''', 34''' would provide different electric fields in these zones so that the liquid crystal molecules in these two zones may be set in different liquid crystal states to thereby improve the issue of color shift of a liquid crystal panel at a large viewing angle, increase aperture ratio of an pixel and enhance the displaying quality of the liquid crystal panel, reduce power consumption, and improve users' experiences. Further, the structure of the liquid crystal panel according to the present invention does not affect the rotation of the liquid crystal molecules. In addition, compared to the first and second embodiments, the instant embodiment has a simpler manufacture process, saves more material, and is more advantageous for reducing the manufacture cost and increasing the transmittance of the liquid crystal panel.

In summary, the present invention provides a liquid crystal panel, which is constructed to form a raised portion or a recessed in a first zone of a sub-pixel so as to provide the first and second zones of the sub-pixel with different liquid crystal cell thicknesses, whereby the first zone and the second zone, when driven by the same driving voltage, induce different electric fields due to the differences of the liquid crystal cell thickness so as to set the liquid crystal molecules in these two zones at different liquid crystal states, improving the issue of color shift of a liquid crystal panel at a large viewing angle, improving aperture ratio of an pixel, transmittance of the liquid crystal panel, and the displaying quality of the liquid crystal panel, reducing power consumption, and reducing manufacture cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A liquid crystal panel, comprising: a thin-film transistor (TFT) substrate, a color filter (CF) substrate opposite to the TFT substrate, and a liquid crystal layer arranged between the TFT substrate and the CF substrate, the TFT substrate comprising a first glass substrate and a pixel electrode provided on a surface of the first glass substrate that faces the CF substrate, the CF substrate comprising a second glass substrate and a common electrode provided on a surface of the second glass substrate that faces the TFT substrate, the pixel electrode constituting a plurality of pixels, each of the pixels comprising a plurality of sub-pixels, each of the sub-pixels comprising: a first zone and a second zone adjacent to the first zone, the first zone having a liquid crystal cell thickness that is greater than or smaller than a liquid crystal cell thickness of the second zone;

wherein the liquid crystal cell thickness of the first zone is greater than the liquid crystal cell thickness of the second zone, the first glass substrate comprising a first recessed section formed in the first zone of the sub-pixel, the pixel electrode being formed with a second recessed section corresponding to the first recessed section; and wherein the first recessed section is formed in the first glass substrate through etching.

2. A liquid crystal panel, comprising: a thin-film transistor (TFT) substrate, a color filter (CF) substrate opposite to the TFT substrate, and a liquid crystal layer arranged between the TFT substrate and the CF substrate, the TFT substrate comprising a first glass substrate and a pixel electrode provided on a surface of the first glass substrate that faces the CF substrate, the CF substrate comprising a second glass substrate and a common electrode provided on a surface of the second glass substrate that faces the TFT substrate, the pixel electrode constituting a plurality of pixels, each of the pixels comprising a plurality of sub-pixels, each of the sub-pixels comprising: a first zone and a second zone adjacent to the first zone, the first zone having a liquid crystal cell thickness that is greater than or smaller than a liquid crystal cell thickness of the second zone;

wherein the liquid crystal cell thickness of the first zone is greater than the liquid crystal cell thickness of the second zone, the second glass substrate comprising a third recessed section formed in the first zone of the sub-pixel, the common electrode being formed with a fourth recessed section corresponding to the third recessed section; and wherein the third recessed section is formed in the second glass substrate through etching.

3. The liquid crystal panel as claimed in claim 1, wherein the liquid crystal layer comprises: an aligning polymer and liquid crystal molecules.

4. The liquid crystal panel as claimed in claim 2, wherein the liquid crystal layer comprises: an aligning polymer and liquid crystal molecules.

\* \* \* \* \*